(12) United States Patent
Warshavsky et al.

(10) Patent No.: US 8,990,144 B2
(45) Date of Patent: *Mar. 24, 2015

(54) SYSTEM, METHOD AND COMPUTER PROGRAM PRODUCT FOR PERFORMING ONE OR MORE ACTIONS UTILIZING A UNIFORM RESOURCE LOCATOR

(71) Applicant: salesforce.com, inc., San Francisco, CA (US)

(72) Inventors: Alex Warshavsky, Walnut Creek, CA (US); Aaron Fiske, San Francisco, CA (US); Bulent Cinarkaya, San Jose, CA (US); Ryan Guest, Stockton, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,735

(22) Filed: Oct. 3, 2013

(65) Prior Publication Data

US 2014/0032632 A1 Jan. 30, 2014

Related U.S. Application Data

(63) Continuation of application No. 12/973,785, filed on Dec. 20, 2010, now Pat. No. 8,583,587.

(60) Provisional application No. 61/311,700, filed on Mar. 8, 2010.

(51) Int. Cl.
*G06F 17/00* (2006.01)
*G06N 7/04* (2006.01)
*H04L 29/08* (2006.01)
*G06N 5/00* (2006.01)

(52) U.S. Cl.
CPC . *H04L 67/10* (2013.01); *G06N 5/00* (2013.01)
USPC .......................................................... 706/54

(58) Field of Classification Search
USPC .......................................................... 706/54
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Michael B Holmes
(74) *Attorney, Agent, or Firm* — Zilka-Kotab, PC

(57) ABSTRACT

In accordance with embodiments, there are provided mechanisms and methods for performing one or more actions utilizing a uniform resource locator. These mechanisms and methods for performing one or more actions utilizing a uniform resource locator can enable improved overall URL usage, more efficient search engine URL results, improved URL comprehension by users, etc.

21 Claims, 7 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,807,576 B1 | 10/2004 | Jeffries et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,536,581 B2 * | 5/2009 | Fiske ............... 714/4.1 |
| 7,603,375 B2 * | 10/2009 | Ng et al. ............... 1/1 |
| 7,620,655 B2 | 11/2009 | Larsson et al. |
| 7,689,832 B2 | 3/2010 | Talmor et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,140,576 B1 * | 3/2012 | Viripaeff et al. ............... 707/781 |
| 8,275,836 B2 | 9/2012 | Beaven et al. |
| 8,447,779 B2 * | 5/2013 | Viripaeff et al. ............... 707/781 |
| 8,457,545 B2 | 6/2013 | Chan |
| 8,484,111 B2 | 7/2013 | Frankland et al. |
| 8,566,449 B2 * | 10/2013 | Guest et al. ............... 709/226 |
| 8,566,654 B2 * | 10/2013 | Cinarkaya et al. ............... 714/57 |
| 8,583,587 B2 * | 11/2013 | Warshavsky et al. ............... 706/54 |
| 8,661,056 B1 * | 2/2014 | Cinarkaya et al. ............... 707/778 |
| 8,688,802 B2 * | 4/2014 | Sureshchandra et al. ............... 709/217 |
| 8,762,947 B2 * | 6/2014 | Lee et al. ............... 717/124 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0042680 A1 | 2/2010 | Czyzewicz et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

SYSTEM, METHOD AND COMPUTER PROGRAM PRODUCT FOR PERFORMING ONE OR MORE ACTIONS UTILIZING A UNIFORM RESOURCE LOCATOR

CLAIM OF PRIORITY

This application is a continuation of U.S. application Ser. No. 12/973,785, filed Dec. 20, 2010, which claims the benefit of U.S. Provisional Application No. 61/311,700, filed Mar. 8, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to analyzing URLs, and more particularly to performing one or more actions utilizing URLs.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Uniform resource locators (URLs) may be utilized in many aspects of conventional systems. For example, a URL may be sent to a system in order to retrieve data from that system (e.g., a web page, a file, etc.). Additionally, search engines may retrieve URLs and may organize and list such URLs in search results. Unfortunately, conventional structuring and usage of URLs has been associated with various limitations.

Just by way of example, traditional methods of generating and using URLs include incorporating random alphanumerical strings into a URL that may not have a logical association with the data requested by the URL. As a result, it may be difficult for a search engine to index such URL, or for a user to easily determine the context of the URL. Accordingly, it is desirable to provide techniques that improve URL usage.

BRIEF SUMMARY

In accordance with embodiments, there are provided mechanisms and methods for performing one or more actions utilizing a uniform resource locator. These mechanisms and methods for performing one or more actions utilizing a uniform resource locator can enable improved overall URL usage, more efficient search engine URL results, improved URL comprehension by users, etc.

In an embodiment and by way of example, a method for performing one or more actions utilizing a uniform resource locator is provided. In one embodiment, a uniform resource locator (URL) is identified. Additionally, the URL is analyzed. Further, one or more actions are performed utilizing the URL, based on the analysis.

While one or more implementations and techniques are described with reference to an embodiment in which performing one or more actions utilizing a uniform resource locator is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for performing one or more actions utilizing a uniform resource locator.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for performing one or more actions utilizing a uniform resource locator will be described with reference to example embodiments.

Figure 1:
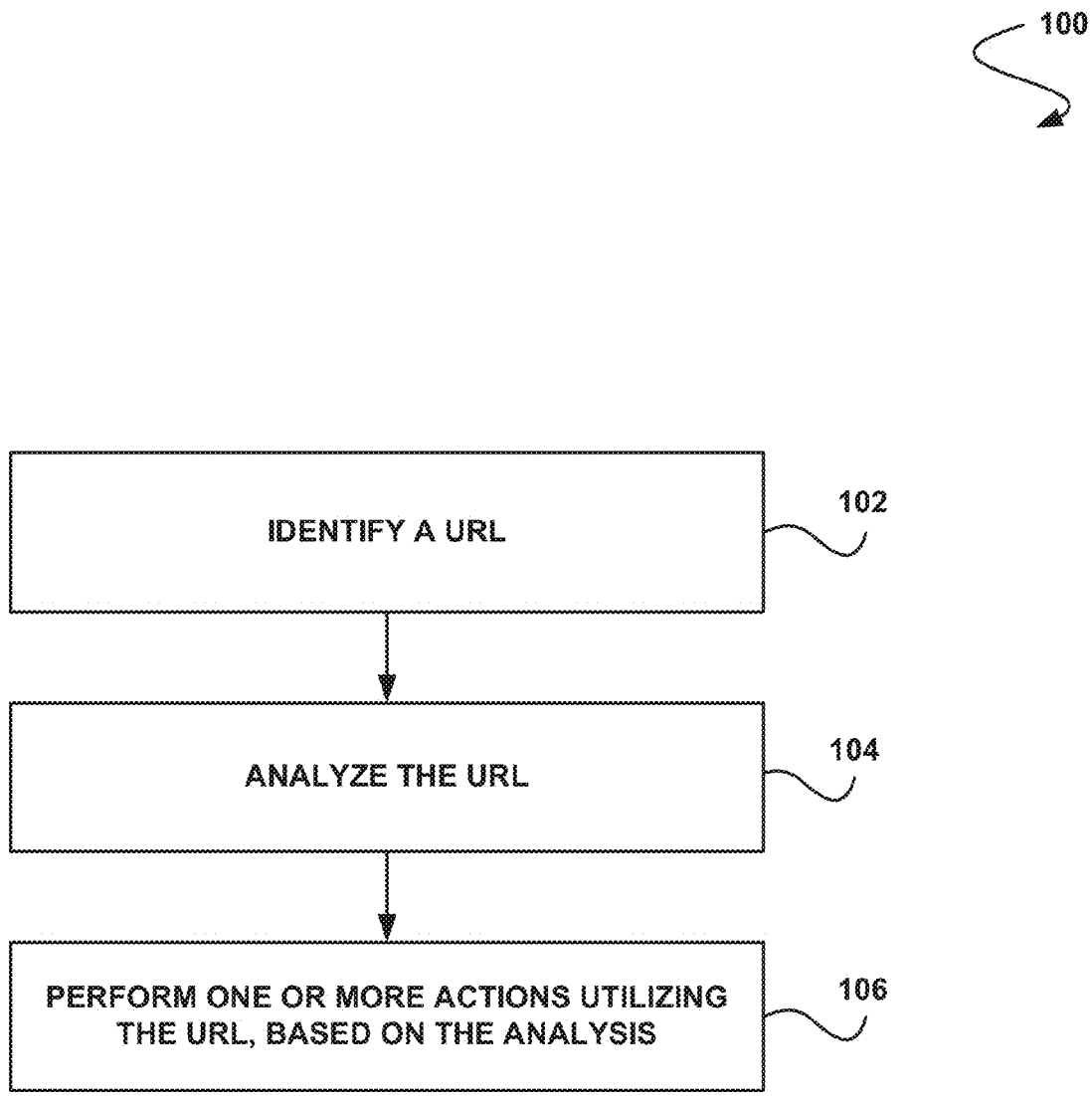
FIG. 1 illustrates a method for performing one or more actions utilizing a uniform resource locator, in accordance with one embodiment.

FIG. 1 illustrates a method 100 for performing one or more actions utilizing a uniform resource locator, in accordance with one embodiment. As shown in operation 102, a uniform resource locator (URL) is identified. In one embodiment, the URL may include any identifier that specifies a location of data. For example the URL may specify where an identified resource (e.g., a site, a file, etc.) is available and a mechanism for retrieving it. In another embodiment, the URL may be submitted by a user.

For example, the user may submit the URL by in Jutting the URL (e.g., typing the URL into an Internet browser, etc.), selecting the URL (e.g., clicking on an Internet link, launching the URL from a bookmark, etc.), etc. In this way, the URL submitted by the user may include a request for data (e.g., the data specified by the URL, etc.). In another embodiment, the URL may be identified as a result of hooking. For example, a hook may intercept a request to an internet site that includes the URL, a request to display the results corresponding to a URL, etc.

Additionally, in another embodiment, the URL may be identified as a result of analyzing a page including the URL. For example, an Internet page hosted by a provider that is to be rendered may be scanned for one or more URLs before the page is rendered, and any URLs found during the scan may be provided to an application associated with the provider. In this way, the URL that is received may include a link to information shown on an Internet page.

Further, in one embodiment, the URL may be received at a system. For example, the URL may be received at a computer, at a server, at a multi-tenant on-demand database system, etc. It should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, the URL is analyzed. In one embodiment, analyzing the URL may include validating the URL. For example, analyzing the URL may include determining whether the URL contains one or more predefined elements. In another example, analyzing the URL may include determining whether the URL is associated with a valid resource (e.g., whether the URL points to a valid site, valid file, etc.). Additionally, in yet another example, analyzing the URL may include determining whether the resource pointed to by the URL is hosted by the provider. Further, in still another example, analyzing the URL may include determining whether code exists at the provider for performing one or more actions utilizing the URL.

Also, in another embodiment, analyzing the URL may include determining code to be used to perform at least one of rewriting the URL, mapping the URL to one or more actions, etc. For example, URL rewrite code may exist on a server for each site hosted by the provider, (e.g., sites for customers of the provider), and one or more portions of the URL (e.g., a host header of the URL, etc.) may be analyzed to determine which rewrite code is to be called to rewrite the URL, or which mapping code is to be called to map the URL to data. In this way, rewrite code and mapping code may be dynamically determined based on the URL.

In addition, as shown in operation 106, one or more actions are performed utilizing the URL, based on the analysis. In one embodiment, the URL may be rewritten if the URL contains one or more of the predefined elements. For example, if it is determined that code exists at the provider for rewriting the URL, then the URL may be rewritten utilizing the code. In another embodiment, the URL may not be rewritten if the URL does not have one or more of the predefined elements. In another embodiment, the URL may be mapped to data within the system if the URL contains one or more of the predefined elements (e.g., code for mapping the URL, etc.), or may not be mapped to the data within the system if the URL does not contain one or more of the predefined elements.

Additionally, in yet another embodiment, rewriting the URL may include altering one or more portions of the URL (e.g., one or more alphanumeric characters of the URL, one or more symbols of the URL, etc.). For example, rewriting the URL may include removing one or more portions of the URL, exchanging one or more portions of the URL with a different portion of data, etc. Additionally, in one embodiment, the one or more actions may be performed according to code (e.g., an application, a program, a class, etc.). For example, an entity (e.g., an individual, an administrator, a customer, etc.) may draft code including one or more rules for rewriting a received URL, redirecting a URL request, etc. In another example, the rules may include rules for mapping one or more elements of the URL to data that is retrieved (e.g., to be displayed on an Internet page, to be displayed in a browser window, to be sent to a user, etc.). In yet another example, the rules may include rules for altering one or more portions of the URL.

Further, in one embodiment, the code may be drafted utilizing an interface. For example, the entity may draft the code utilizing a drafting interface provided by a system (e.g., the system having the data pointed to by the URL) that includes tables illustrating one or more actions that can be taken with respect to the URL. Also, in another embodiment, the rewritten URL may be displayed (e.g., on an Internet page, as a link, etc.). In yet another embodiment, the URL may be used to retrieve one or more data elements (e.g., a mapped internet page, file, etc.). In yet another embodiment, the code may be associated with a particular site of the system, a particular account of the system, etc. In still another embodiment, the code may be drafted utilizing real expressions.

In this way, custom URLs may be used instead of standard URLs (e.g., in an Internet browser, a request to a system, etc.). Additionally, these custom URLs may be made more human readable. Further, custom URLs may be more easily readable by search engines and may therefore be indexed more easily. Further still, the custom URLs may include descriptive language associated with the data pointed to by the URL (e.g., a name of an entity, an object, a page, etc.). As such, a user may be able to control what they want the URL to look like.

Figure 2:
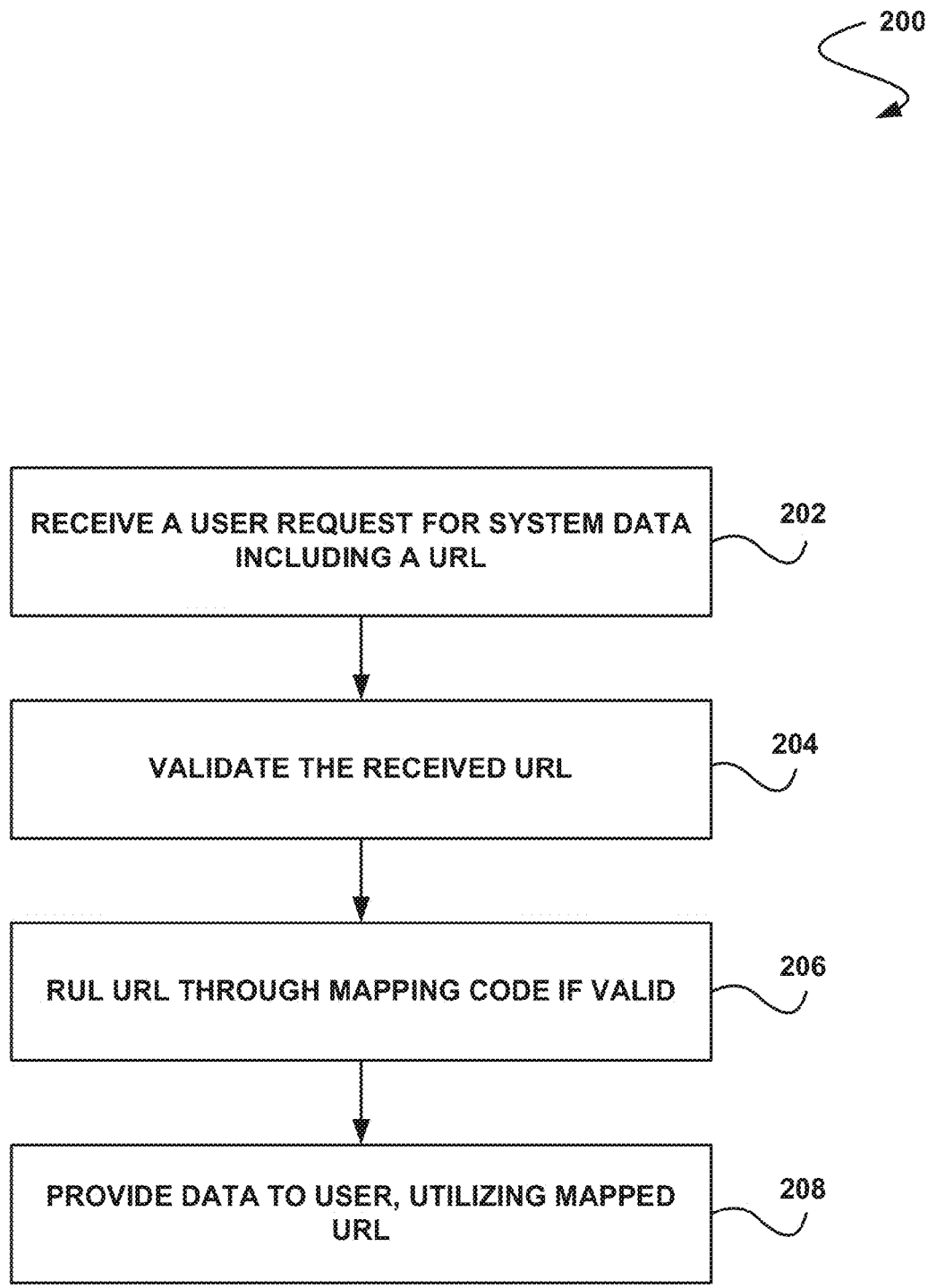
FIG. 2 illustrates a method for providing data to a user utilizing a URL mapping, in accordance with another embodiment.

FIG. 2 illustrates a method 200 for providing data to a user utilizing a URL mapping, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a user request for system data including a URL is received. In one embodiment, a user may enter a URL request for a page hosted by the system into an Internet browser, and the URL request may then be sent to the system. In another embodiment, the URL may include a custom URL. For example, the URL may include data that is customized by a customer of the system.

Additionally, as shown in operation 204, the received URL is validated. In one embodiment, the system may determine whether a site exists for the received URL. Additionally, the system may determine whether mapping code is defined within the system for the site pointed to by the URL. Further, as shown in operation 206, the URL is run through the mapping code if the URL is determined to be valid. In one embodiment, if it is determined that mapping code is defined within the system for the URL, then the mapping code may be applied to the URL in order to determine which data within the system is to be returned to the user.

For example, the URL may include a language identifier (e.g., "/en," etc.), and the mapping code may internally translate the language identifier to code necessary for a page to be returned in a certain language dictated by the language identifier. In another example, the URL may include a user identifier, and the mapping code may internally translate the user identifier into code necessary for a page to be returned that is associated with the user identified by the user identifier. In yet another example, the URL may include a page identifier, and the mapping code may internally translate the page identifier into code necessary for that page to be returned to the user. In still another example, a plurality of identifiers may be chained within the URL.

Additionally, in one embodiment, the mapping code may be created by a client of the system (e.g., a customer of the system, a user of the system, an administrator of the system, etc.). For example, the client's data may be hosted by the system. In another example, the client may specify in the mapping code which URLs/portions of URLs map to which actions to be taken in the system.

Further still, as shown in operation 206, the system data is provided to the user, utilizing the mapped URL. In one embodiment, the mapping code may map the URL to a system record, and the system record may then be returned to the user. In this way, the system may interpret received URLs based on mapping code provided by the client of the system. Further, the client may be able to dictate how client data stored on the system is handled when a URL requesting such data is received.

Figure 3:
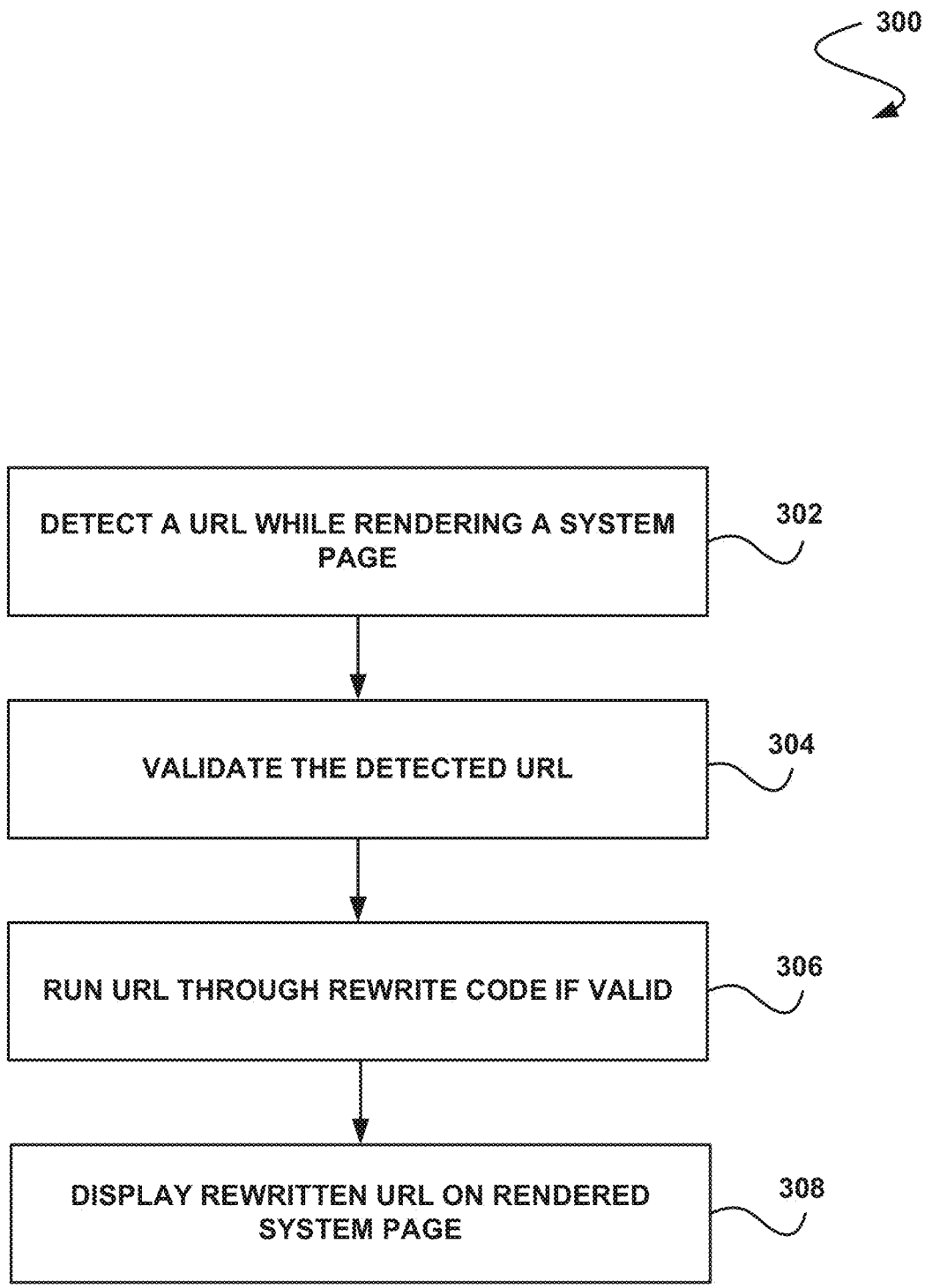
FIG. 3 illustrates a method for rewriting a URL to be displayed, in accordance with yet another embodiment.

FIG. 3 illustrates a method 300 for rewriting a URL to be displayed, in accordance with another embodiment. As an option, the present method 300 may be carried out in the context of the functionality of FIGS. 1-2. Of course, however, the method 300 may be carried out in any desired environment. The aforementioned definitions may apply during the present description, As shown in operation 302, a URL is detected while rendering a system page (e.g., generating a page from the system, etc.). In one embodiment, the URL may be included in a page showing system data (e.g., on a network, the Internet, etc.). For example, the URL may be included within a hyperlink of an Internet page. In another embodiment, the system page may be created by a client of the system. For example, the client may create the system page in order to display client data stored within the system. In yet another embodiment, the URL may be identified by hooking. Additionally, as shown in operation 304, the detected URL is validated. In one embodiment, the system may determine whether rewriting code is defined within the system for the URL.

Further, as shown in operation 306, the URL is run through the rewriting code if the URL is determined to be valid. In one embodiment, if it is determined that rewriting code is defined within the system for the URL, then the rewriting code may be applied to the URL in order to determine which URL is to be displayed on the system page, and the URL may be rewritten accordingly. In another embodiment, a client may specify in the rewriting code which URLs/portions of URLs map to which rewritten URLs to be displayed on the system page.

Further still, as shown in operation 308, the rewritten URL is displayed on the rendered system page. In this way, client-specified URLs may be used in system pages. Additionally, the rewritten URLs may be clearer to viewers of the system page, and may be more easily indexed by one or more search engines. Further, clients that move to a new system page may remap URLs to the new page (e.g., in order to preserve search engine page rank, etc.).

In another embodiment, a plurality of URLs may be detected while rendering the system page. Additionally, the plurality of URLs may be flagged in the page, and may be listed and sent to the rewriting code before rendering (e.g., in a single call). Further, the plurality of URLs may be rewritten by the rewriting code and may replace the plurality of URLs in the system page before being presented to the user. In this way, URLs may be rewritten in an efficient manner.

Additionally, the a for mentioned methods may have multiple applications. In one embodiment, custom URLs may be consumed. For example, users may be given an ability to use a custom URL based on their own logic/preferences when a site request comes to the system and may map it to a URL that the system expects. For example, users have the ability to rewrite a site URL normally generated by the system and rewrite it to a custom URL. In another embodiment, custom URLs may be dynamically generated by the system. For instance, URLs may be generated using a URLFOR function as described herein.

In yet another embodiment, URL re-rewriting may support file based system pages and database based system pages. Additionally, file based visual force (VF) page extensions may also be supported. Further, in one embodiment, URL re-writing may prevent rewrite results to be interpreted as hap error pages. For example, in this embodiment, a user can not rewrite a page as "InMaintenance" or "PageNotFound" pages.

Further, in one embodiment, an interface (e.g., an Apex interface) may be provided that may allow customers to implement URL rewriting rules in both directions (e.g., at the beginning of request to map custom URL to the one the system expects and at [page] generation time to generate a custom URL from a system one. In another embodiment, customers may implement the interface in an Apex class and may associate the class with a site. Table 1 illustrates an exemplary rule interface. Of course, it should be noted that the interface shown in Table 1 is set forth for illustrative purposes only, and thus should not be construed as limiting in any manner. Additionally, in one embodiment, this interface may be hidden behind a permanent site mapping (e.g. perm SitesUrlMapping).

TABLE 1 global interface UrlRewriter {
   PageReference mapRequestUrl(PageReference requestUrl);
   PageReference[ ] generateUrlFor(PageReference[ ] generatedUrls);
}

In another embodiment, mapping code may be invoked by a Java process. For example, one method of calling an Apex function from Java is to use an ApexWallTest. In another embodiment, UserContext may be needed so that the customers can perform SOQL queries and SOSL searches that may be needed for mapping a URL.

In yet another embodiment, the interface may be called in two places. For example, it may be called in a request or in a response. With respect to requests: the interface may be called right after a user context is established (e.g., the earliest opportunity to execute the apex code). In one implementation, a mapRequestUrl() method may be utilized. Additionally, there may be other places where this or a similar call is invoked, e.g. during normal page processing and by a static resource servlet.

Additionally, with respect to responses, the interface lay be called in a URLFOR implementation, e.g. a call to generate custom URL by the system. For example, URLFOR generates URLs. URL generation can include many URLs, and it may be resource expensive. In one embodiment, the call to generate custom URLs is made for every URL. In this way, the URLs may be processed in bulk. Similarly, the call to generate all of the URLs may be made at the same time. In one embodiment, rendering may be such that a generated URL may be looked up from cached result(s).

In another embodiment, in order to prevent, loops, reentrant calls to a UrlMapper may be detected (e.g. via a forward process that has already processed the URL), an attribute may be set, and the call may be skipped.

Further, in one embodiment, built-in logic may be provided that helps a user display user-friendly URLs and links to site visitors. For example, rules may be created to rewrite site URL requests typed into the address bar, launched from bookmarks, or linked from external websites. In one embodiment, users can create rules to rewrite the URLs for links within site pages.

In one example, a user has a web log (blog) site. Without URL rewriting, a blog entry's URL might look like this: "http://myblog.force.com/posts?id=003D000000Q0PcN." With URL rewriting, the user may allow other users to access blog posts by criteria such as date and title, instead of by record ID. In another example, the URL for one of your New Year's Eve posts might be "http://myblog.force.com/posts/2008/12/31/auld-lang-syne." In another embodiment, URLs for links shown within a site page may be rewritten. For example, if your New Year's Eve post contained a link to your Valentine's Day post, the link URL might show: "http://myblog.force.com/posts/2008/02/14/last-minute-roses." Additionally, in one embodiment. URL rewriting may be implemented by creating an Apex class and associating it with a user site.

Further still, in one embodiment, URL rewriting may be added to a site. Table 2 illustrates exemplary steps to add URL rewriting to a site. Of course, it should be noted that the steps shown in Table 2 are set forth for illustrative purposes only, and thus should not be construed as limiting in any manner.

TABLE 2

1. Click Setup ➤ Develop ➤ Sites.
2. Click New or click Edit for an existing site.
3. On the Site Edit page, choose an Apex class for URL Rewriter Class.
4. Click Save.

Additionally, Table 3 illustrates exemplary class form for URL rewriting. Of course, it should be noted that the class shown in Table 3 is set forth for illustrative purposes only, and thus should not be construed as limiting in any manner.

TABLE 3

```
global class yourClass implements Site.UrlRewriter {
    global PageReference mapRequestUrl(PageReference
        yourFriendlyUrl)
    global PageReference[ ] generateUrlFor(PageReference[ ]
        yourSalesforceUrls);
}
```

In one embodiment, the mapRequestUrl method may map a friendly URL to a system URL. The generateUrlFor method maps a list of system URLs to a list of friendly URLs. In another embodiment, List<PageReference> may be used instead of PageReference[].

Further, in one embodiment, a site may consist of two system pages: contact and account. In another embodiment, each page may use the standard controller for its object type. In yet another embodiment, the contact page may include a link to the parent account, plus contact details. Table 4 illustrates a standard controller for accounts. Of course, it should be noted that the controller shown in Table 4 is set forth for illustrative purposes only, and thus should not be construed as limiting in any manner. In one embodiment, the standard controller may include a standard detail page. In another embodiment, this page may be named "account."

TABLE 4

```
<apex:page standardController="Account">
    <apex:detail relatedList="false"/>
</apex:page>
```

Table 5 illustrates a contact page, Of course, it should be noted that the contact page shown in Table 5 is set forth for illustrative purposes only, and thus should not be construed as limiting in any manner. In one embodiment, the contact page may uses the standard controller for contacts and may consist of two parts. In another embodiment, this page may be named "contact". Additionally, in yet another embodiment, the first part may link to the parent account using the URLFOR function and the $Page merge variable, and the second part may provide the contact details.

TABLE 5

```
<apex:page standardController="contact">
    <apex:pageBlock title="Parent Account">
        <apex:outputLink value="{!URLFOR($Page.account,null,
            [id=contact.account.id])}">{!contact.account.name}
        </apex:outputLink>
    </apex:pageBlock>
    <apex:detail relatedList="false"/>
</apex:page>
```

Table 6 illustrates an exemplary class that can be used to rewrite the URLs for pages. Of course, it should be noted that the class shown in Table 6 is set forth for illustrative purposes only, and thus should not be construed as limiting in any manner. In one embodiment, the exemplary class used as the URL rewriter for the site may use the mapRequestUrl method to map incoming URL requests to the right system record. Additionally, the class may also use the generateUrlFor method to rewrite the URL for the link to the account page in a more user-friendly form.

TABLE 6

```
global class myRewriter implements Site.UrlRewriter {
        //Variables to represent the friendly URLs for
        //account and contact pages
        String ACCOUNT_PAGE = '/account/';
        String CONTACT_PAGE = '/contact/';
        //Variables to represent my custom Visualforce pages
        //that display account and contact information
        String ACCOUNT_VISUALFORCE_PAGE = '/account?id=';
        String CONTACT_VISUALFORCE_PAGE = '/contact?id=';
        global PageReference mapRequestUrl(PageReference
                    myFriendlyUrl) {
            String url = myFriendlyUrl.getUrl( );
            if(url.startsWith(CONTACT_PAGE)){
                //Extract the name of the contact from the URL
                //For example: /contact/Ryan returns Ryan
                String name = url.substring(CONTACT_PAGE.length( ),
                        url.length( ));
                //Select the ID of the contact that matches
                //the name from the URL
                Contact con = [select id from Contact where name =:
                        name LIMIT 1];
                //Construct a new page reference in the form
                //of my Visualforce page
                return new
                    PageReference(CONTACT_VISUALFORCE_PAGE +
                    con.id);
            }
            if(url.startsWith(ACCOUNT_PAGE)){
                //Extract the name of the account
                String name = url.substring(ACCOUNT_PAGE.length( ),
                        url.length( ));
                //Query for the ID of an account with this name
                Account acc = [select id from Account where name =:
                        name LIMIT 1];
                //Return a page in Visualforce format
                return new PageReference(ACCOUNT_VISUALFORCE_PAGE +
                        acc.id);
            }
            //If the URL isn't in the form of a contact or
            //account page, continue with the request
            return null;
        }
    global List<PageReference> generateUrlFor(List<PageReference>
                mySalesforceUrls){
            //A list of pages to return after all the links
            //have been evaluated
            List<PageReference> myFriendlyUrls = new
                    List<PageReference>( );
            for(PageReference mySalesforceUrl : mySalesforceUrls){
                //Get the URL of the page
                String url = mySalesforceUrl.getUrl( );
                //If this looks like an account page, transform it
                if(url.startsWith(ACCOUNT_VISUALFORCE_PAGE)){
                    //Extract the ID from the query parameter
                    String id= url.substring
                            (ACCOUNT_VISUALFORCE_PAGE.length( ),
                            url.length( ));
                    //Query for the name of the account to
                    //put in the URL
                    Account acc = [select name from Account
                            where id =: id LIMIT 1];
                    //Construct the new URL
                    myFriendlyUrls.add(new PageReference(ACCOUNT_PAGE +
                            acc.name));
                }
                else {
                    /If this doesn't start like an account page,
                    //don't do any transformations
                    myFriendlyUrls.add(mySalesforceUrl);
                }
            }
            //Return the full list of pages
            return myFriendlyUrls;
        }
}
```

Figure 4:
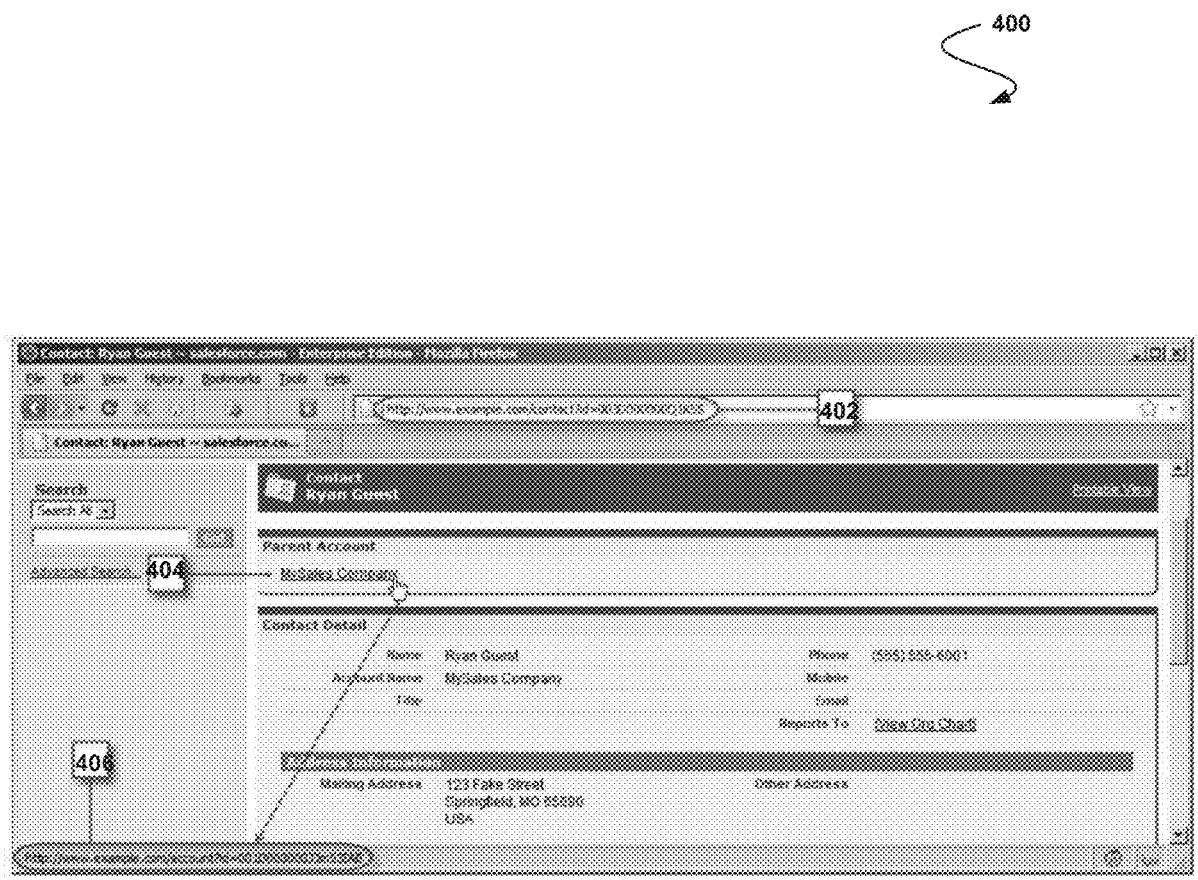
FIG. 4 illustrates address bar and link URLs before implementing rewriting, in accordance with yet another embodiment.
Figure 5:
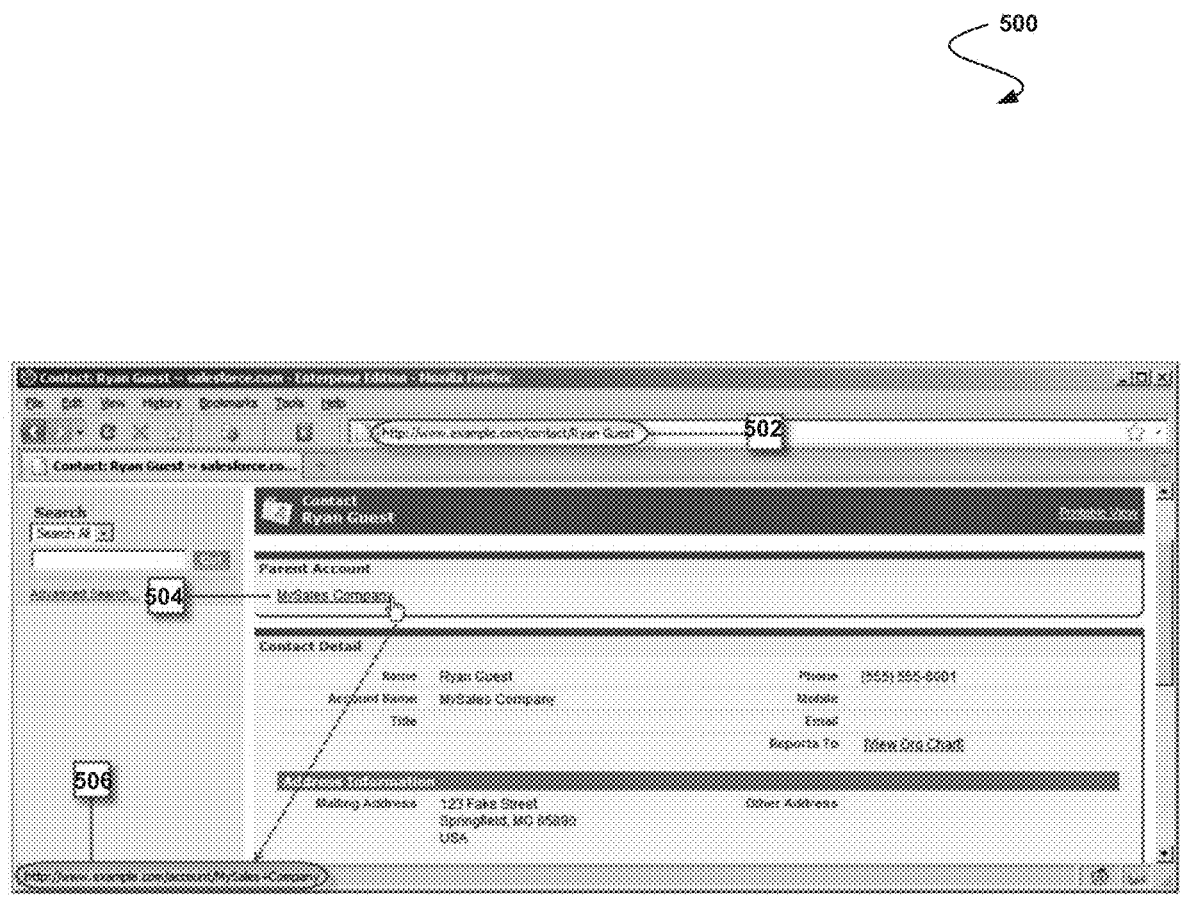
FIG. 5 illustrates address bar and link URLs after implementing rewriting, in accordance with yet another embodiment.

In one embodiment, before implementing rewriting, the address bar and link URLs may show the record 111) (a random 15-digit string), as shown in FIG. 4. Once rewriting is enabled, the address bar and links may show more user-friendly rewritten URLs, as shown in FIG. 5. As shown in FIG. 4, the original URL 402 is shown for the contact page before rewriting. Additionally, the link 404 to the parent account page from the contact page is shown. Further, the original URL 406 for the link to the account page is shown before rewriting in the browsers status bar. Also, as shown in FIG. 5, the rewritten URL 502 is shown for the contact page after rewriting. Additionally, the link 504 to the parent account page from the contact page is shown. Further, the rewritten URL 506 for the link to the account page after rewriting is shown in the browser's status bar.

System Overview

Figure 6:
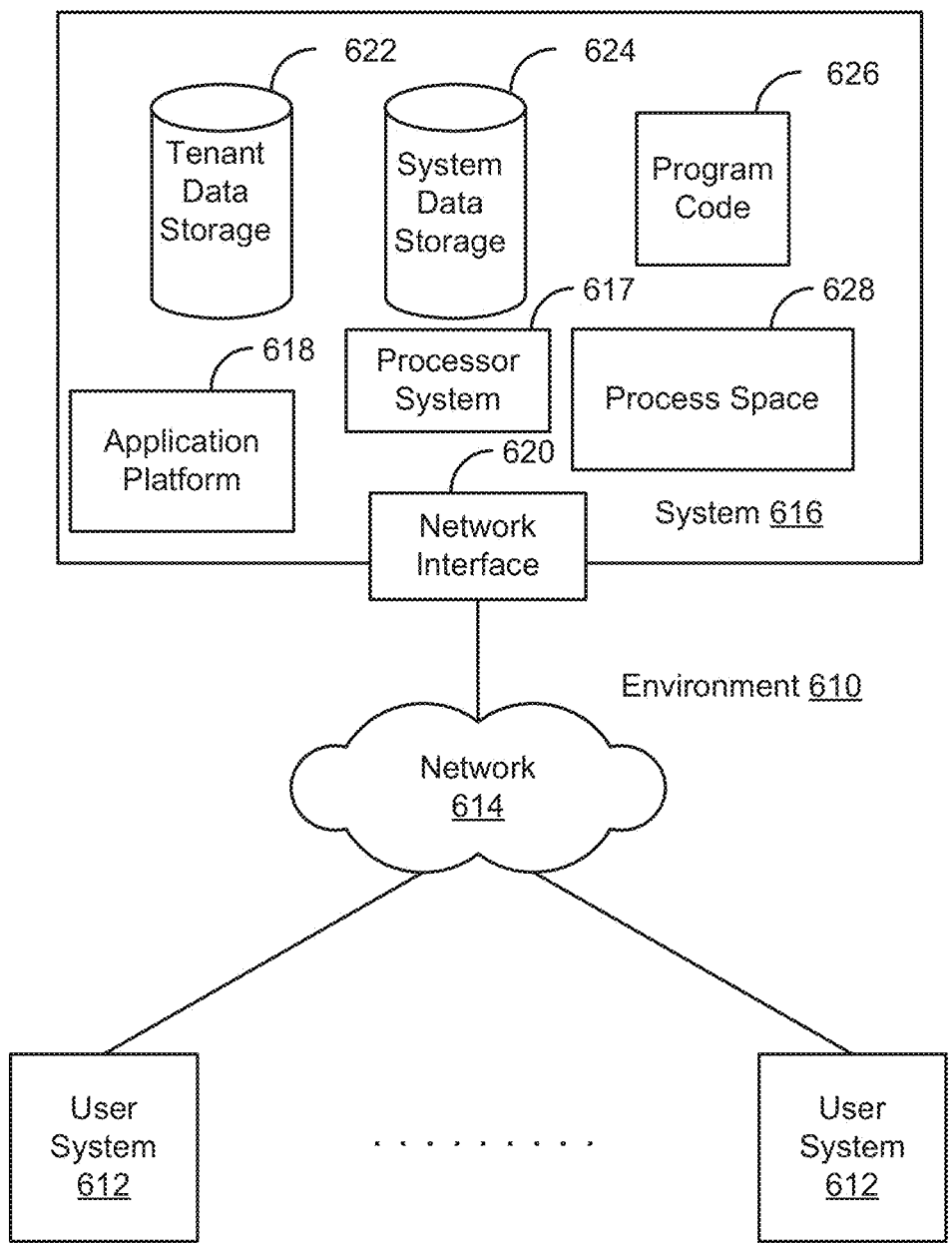
FIG. 6 illustrates a block diagram of an example of an environment wherein an on-demand database system might be used.

FIG. 6 illustrates a block diagram of an environment 610 wherein an on-demand database system might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database system exists. User system 612 may be any machine or system that is used by a user to access a database user system. For example, any of user systems 612 can be a handheld computing device, a mobile phone, a laptop computer, a work station, and/or a network of computing devices, As illustrated in FIG. 6 (and in more detail in FIG. 7) user systems 612 might interact via a network 614 with an on-demand database system, which is system 616.

An on-demand database system, such as system 616, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database system 616 may include an application platform 618 that enables creation, managing and executing one or more applications developed by the provider of the on-demand database system, users accessing the on-demand database system via user systems 612, or third party application developers accessing the on-demand database system via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP. etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged no that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
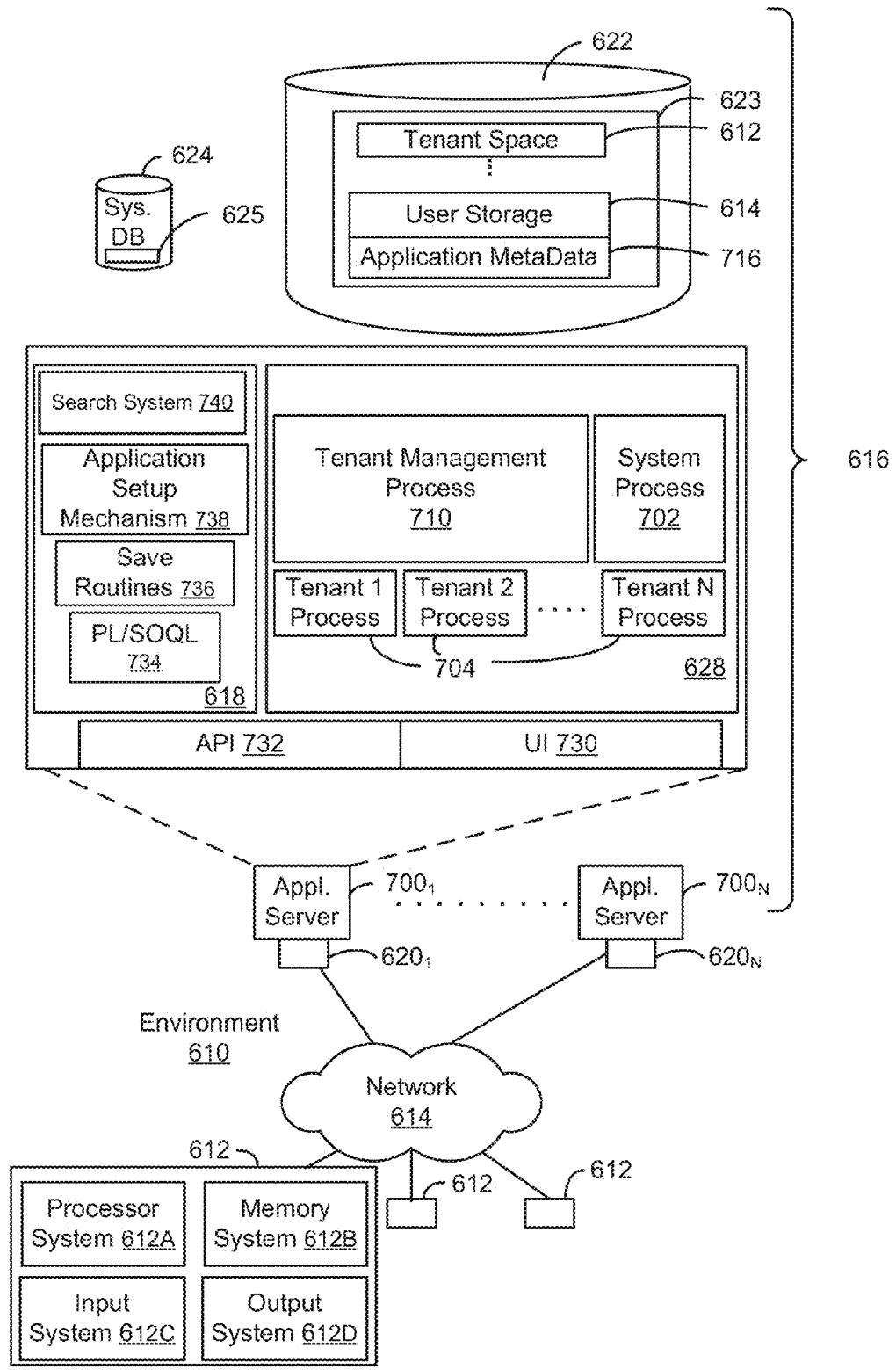
FIG. 7 illustrates a block diagram of an embodiment of elements of FIG. 4 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625. User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory, Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the us1er level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. it should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising computer code causing a computer to implement a method, the method comprising:
 identifying by a system a uniform resource locator (URL);
 analyzing the URL by the system; and
 performing one or more actions by the system utilizing the URL, based on the analysis.

2. The computer program product of claim 1, wherein the URL is submitted by a user.

3. The computer program product of claim 1, wherein the URL is identified as a result of analyzing a page including the URL.

4. The computer program product of claim 1, wherein the computer program product is operable such that an Internet page hosted by a provider that is to be rendered is scanned for one or more URLs before the page is rendered.

5. The computer program product of claim 1, wherein analyzing the URL includes validating the URL.

6. The computer program product of claim 1, wherein analyzing the URL includes determining whether the URL contains one or more predefined elements.

7. The computer program product of claim 1, wherein analyzing the URL includes determining whether code exists at a provider for performing one or more actions utilizing the URL.

8. The computer program product of claim 1, wherein analyzing the URL includes determining code to be used to perform at least one of rewriting the URL and mapping the URL to data.

9. The computer program product of claim 1, wherein the computer program product is operable such that if it is determined that code exists at a provider for rewriting the URL, then the URL is rewritten utilizing the code.

10. The computer program product of claim 1, wherein the computer program product is operable such that the URL is mapped to data within the system if the URL contains code for mapping the URL.

11. The computer program product of claim 9, wherein rewriting the URL includes at least one of removing one or more portions of the URL and exchanging one or more portions of the URL with a different portion of data.

12. The computer program product of claim 1, wherein the computer program product is operable such that the one or more actions are performed according to code.

13. The computer program product of claim 12, wherein the computer program product is operable such that an entity drafts the code including one or more rules for at least one of rewriting the identified URL and redirecting a URL request.

14. The computer program product of claim 13, wherein the rules include rules for mapping one or more elements of the URL to data that is retrieved.

15. The computer program product of claim 13, wherein the rules include rules for altering one or more portions of the URL.

16. The computer program product of claim 12, wherein the computer program product is operable such that the code is drafted utilizing an interface.

17. The computer program product of claim 1, wherein the URL is identified as a result of hooking 18. The computer program product of claim 1, wherein the system includes a multi-tenant on-demand database system.

19. A method, comprising:
 receiving at a system a uniform resource locator (URL);
 analyzing the URL by the system; and
 performing one or more actions by the system utilizing the URL, based on the analysis.

20. A system, comprising:
 a hardware processor for:
 receiving a uniform resource locator (URL);
 analyzing the URL; and
 performing one or more actions utilizing the URL, based on the analysis.

21. A method for transmitting code for use in a multi-tenant database system on a transmission medium, the method comprising:
 transmitting code for receiving at a system a uniform resource locator (URL);
 transmitting code for analyzing the URL by the system; and
 transmitting code for performing one or more actions by the system utilizing the URL, based on the analysis.

* * * * *